United States Patent
Sterling et al.

(10) Patent No.: US 8,994,744 B2
(45) Date of Patent: Mar. 31, 2015

(54) METHOD AND SYSTEM FOR MASTERING AND DISTRIBUTING ENHANCED COLOR SPACE CONTENT

(75) Inventors: Michael Allan Sterling, Westlake Village, CA (US); Eugene Murphy O'Donnell, Fishers, IN (US)

(73) Assignee: Thomson Licensing, Boulogne-Billancourt (FR)

(*) Notice: Subject to any disclaimer, the term of this patent is extended or adjusted under 35 U.S.C. 154(b) by 1043 days.

(21) Appl. No.: 11/665,809

(22) PCT Filed: Oct. 27, 2005

(86) PCT No.: PCT/US2005/039352
§ 371 (c)(1),
(2), (4) Date: Apr. 18, 2007

(87) PCT Pub. No.: WO2006/050305
PCT Pub. Date: May 11, 2006

(65) Prior Publication Data
US 2007/0291179 A1    Dec. 20, 2007

Related U.S. Application Data

(60) Provisional application No. 60/623,882, filed on Nov. 1, 2004.

(51) Int. Cl.
*H04N 1/64* (2006.01)
*H04N 1/60* (2006.01)
*H04N 9/64* (2006.01)

(52) U.S. Cl.
CPC ............... *H04N 1/64* (2013.01); *H04N 1/6058* (2013.01); *H04N 9/64* (2013.01)
USPC ....................................................... 345/600

(58) Field of Classification Search
CPC ............... G09G 5/02; G09G 2340/06; G09G 2300/0452; H04N 1/60; H04N 1/6002; H04N 1/6058; H04N 13/0062; H04N 13/0066
See application file for complete search history.

(56) References Cited

U.S. PATENT DOCUMENTS

| 4,663,663 A | 5/1987 | Lee |
| 4,670,780 A | 6/1987 | McManus et al. |

(Continued)

FOREIGN PATENT DOCUMENTS

| DE | 10023270 | 5/2000 |
| EP | 0183539 A2 | 6/1986 |

(Continued)

OTHER PUBLICATIONS

International Search Report, dated Feb. 20, 2006.

(Continued)

*Primary Examiner* — Antonio A Caschera
(74) *Attorney, Agent, or Firm* — Robert D. Shedd; Joseph J. Opalach

(57) ABSTRACT

A method and system for mastering and distributing enhanced color space content for different display devices (target color space) having display capabilities beyond that of CRT color space. The content creator(s) establishes base or reference color space and enhanced color space data for each target color space. The enhanced color space data is stored as metadata and transmitted over an enhanced color channel separately from the base/reference color space. Both the base/reference data and metadata are encoded before transmission and decoded on the consumer side either by a separate decoder or a display device having an integrated decoder. In other aspects of the invention, auxiliary data relating to the target color space, such as, for example, brightness, luminance, contrast and other display settings can be transmitted over the enhanced color channel and decoded to control the target color space settings (i.e., display settings). The color adjustment metadata could be included in the auxiliary data or maintained separate from the same depending on the desired implementation.

15 Claims, 5 Drawing Sheets

(56) References Cited

U.S. PATENT DOCUMENTS

| | | | |
|---|---|---|---|
| 4,689,669 A | 8/1987 | Hoshino et al. |
| 4,975,769 A | 12/1990 | Aizu et al. |
| 4,994,901 A | 2/1991 | Parulski et al. |
| 5,212,546 A | 5/1993 | Arazi et al. |
| 5,233,684 A | 8/1993 | Ulichney |
| 5,268,754 A | 12/1993 | Van de Capelle et al. |
| 5,311,295 A | 5/1994 | Tallman et al. |
| 5,333,069 A | 7/1994 | Spence |
| 5,377,041 A | 12/1994 | Spaulding et al. |
| 5,416,614 A | 5/1995 | Crawford |
| 5,416,890 A | 5/1995 | Beretta |
| 5,475,402 A | 12/1995 | Hijikata |
| 5,541,742 A | 7/1996 | Imao et al. |
| 5,568,596 A | 10/1996 | Cawley |
| 5,587,979 A | 12/1996 | Bluthgen |
| 5,668,890 A | 9/1997 | Winkelman |
| 5,731,818 A | 3/1998 | Wan et al. |
| 5,742,350 A | 4/1998 | Pan et al. |
| 5,754,184 A | 5/1998 | Ring et al. |
| 5,805,213 A | 9/1998 | Spaulding et al. |
| 5,832,109 A | 11/1998 | Mahy |
| 5,832,120 A | 11/1998 | Prabhakar et al. |
| 5,990,982 A | 11/1999 | Gove et al. |
| 6,044,172 A | 3/2000 | Allen |
| 6,075,573 A | 6/2000 | Shyu |
| 6,100,999 A | 8/2000 | Ikegami |
| 6,101,272 A | 8/2000 | Noguchi |
| 6,229,626 B1 | 5/2001 | Boll |
| 6,243,133 B1 | 6/2001 | Spaulding et al. |
| 6,268,939 B1 | 7/2001 | Klassen et al. |
| 6,282,312 B1 | 8/2001 | McCarthy et al. |
| 6,340,975 B2 | 1/2002 | Marsden et al. |
| 6,351,320 B1 | 2/2002 | Shin |
| 6,360,007 B1 | 3/2002 | Robinson et al. |
| 6,388,648 B1 | 5/2002 | Clifton et al. |
| 6,421,094 B1 | 7/2002 | Han |
| 6,421,142 B1 | 7/2002 | Lin et al. |
| 6,445,816 B1 | 9/2002 | Pettigrew |
| 6,445,874 B1 | 9/2002 | Catlow |
| 6,516,089 B1 | 2/2003 | McCann et al. |
| 6,560,358 B1 | 5/2003 | Tsukada |
| 6,563,946 B2 | 5/2003 | Kato |
| 6,591,009 B1 | 7/2003 | Usami et al. |
| 6,603,483 B1 | 8/2003 | Newman |
| 6,621,604 B2 | 9/2003 | DeLean |
| 6,707,938 B2 | 3/2004 | de Queiroz et al. |
| 6,754,384 B1 | 6/2004 | Spaulding et al. |
| 6,771,323 B1 | 8/2004 | Dean et al. |
| 6,775,407 B1 | 8/2004 | Gindele et al. |
| 6,822,760 B1 | 11/2004 | Spaulding et al. |
| 6,826,303 B2 | 11/2004 | D'Souza et al. |
| 6,873,439 B2 | 3/2005 | Levy et al. |
| 6,885,381 B1 | 4/2005 | Ford et al. |
| 6,897,876 B2 | 5/2005 | Murdoch et al. |
| 6,947,589 B2 | 9/2005 | Newman et al. |
| 6,977,661 B1 * | 12/2005 | Stokes et al. ............ 345/589 |
| 6,979,069 B2 | 12/2005 | Tamagawa |
| 6,999,617 B1 | 2/2006 | Ohga |
| 7,057,765 B1 | 6/2006 | Fischer et al. |
| 7,184,057 B2 | 2/2007 | Stokes et al. |
| 7,345,787 B2 | 3/2008 | Ito et al. |
| 7,403,304 B2 | 7/2008 | Andreas et al. |
| 7,515,161 B1 | 4/2009 | Morgan |
| 8,149,338 B2 | 4/2012 | Rehm et al. |
| 2001/0008428 A1 | 7/2001 | Oh |
| 2001/0017627 A1 | 8/2001 | Marsden et al. |
| 2001/0033286 A1 | 10/2001 | Stokes et al. |
| 2002/0027603 A1 | 3/2002 | Kuwata et al. |
| 2002/0118211 A1 | 8/2002 | Figueroa et al. |
| 2002/0118380 A1 | 8/2002 | Krueger et al. |
| 2002/0120781 A1 | 8/2002 | Hirashima et al. |
| 2002/0122044 A1 | 9/2002 | Deering |
| 2002/0122194 A1 | 9/2002 | Kuwata et al. |
| 2002/0130957 A1 | 9/2002 | Gallagher et al. |
| 2002/0140952 A1 | 10/2002 | Fukasawa |
| 2002/0163657 A1 | 11/2002 | Bogdanowicz et al. |
| 2002/0163676 A1 | 11/2002 | Jones et al. |
| 2002/2163676 | 11/2002 | Jones et al. |
| 2002/0180892 A1 | 12/2002 | Cacciatore et al. |
| 2003/0012427 A1 | 1/2003 | Martinez-Uriegas et al. |
| 2003/0012432 A1 | 1/2003 | D'Souza et al. |
| 2003/0030754 A1 | 2/2003 | Tsukada |
| 2003/0052904 A1 | 3/2003 | Gu |
| 2003/0053683 A1 | 3/2003 | Newman et al. |
| 2003/0081828 A1 | 5/2003 | Curry |
| 2003/0117413 A1 | 6/2003 | Matsuda |
| 2003/0122842 A1 | 7/2003 | Newman |
| 2003/0160801 A1 | 8/2003 | Butler |
| 2003/0174885 A1 | 9/2003 | Levy et al. |
| 2003/0193598 A1 | 10/2003 | Takemura |
| 2003/0208638 A1 | 11/2003 | Abrams, Jr. et al. |
| 2004/0021672 A1 | 2/2004 | Wada |
| 2004/0041920 A1 | 3/2004 | Hiromichi et al. |
| 2004/0061740 A1 | 4/2004 | Tamagawa |
| 2004/0100643 A1 | 5/2004 | Jones et al. |
| 2004/0105581 A1 | 6/2004 | Sawada |
| 2004/0113864 A1 | 6/2004 | Nonaka |
| 2004/0129149 A1 | 7/2004 | Ross |
| 2004/0131249 A1 | 7/2004 | Sandrew |
| 2004/0145590 A1 | 7/2004 | Yu et al. |
| 2004/0170330 A1 | 9/2004 | Fogg |
| 2004/0196250 A1 | 10/2004 | Mehrotra et al. |
| 2004/0263528 A1 | 12/2004 | Murdoch et al. |
| 2004/0263882 A1 | 12/2004 | Ito et al. |
| 2005/0021258 A1 | 1/2005 | Fasciano |
| 2005/0073730 A1 | 4/2005 | Huang et al. |
| 2005/0134801 A1 | 6/2005 | Bogdanowicz et al. |
| 2005/0141008 A1 | 6/2005 | Billow et al. |
| 2005/0141848 A1 | 6/2005 | Deguchi et al. |
| 2005/0147295 A1 | 7/2005 | Kim et al. |
| 2005/0152597 A1 | 7/2005 | Spaulding et al. |
| 2005/0152612 A1 | 7/2005 | Spaulding et al. |
| 2005/0248785 A1 | 11/2005 | Henley et al. |
| 2005/0270382 A1 | 12/2005 | Kurumisawa |
| 2006/0018536 A1 | 1/2006 | Haikin et al. |
| 2006/0096483 A1 | 5/2006 | Andreas et al. |
| 2006/0103861 A1 | 5/2006 | Klassen et al. |
| 2006/0244983 A1 | 11/2006 | Zeng |
| 2007/0046958 A1 | 3/2007 | Hoof et al. |
| 2007/0078563 A1 | 4/2007 | Harris et al. |
| 2007/0121132 A1 | 5/2007 | Blinn et al. |
| 2007/0211074 A1 | 9/2007 | Yeung |
| 2007/0223813 A1 | 9/2007 | Segall et al. |
| 2007/0268411 A1 | 11/2007 | Rehm et al. |
| 2007/0291179 A1 | 12/2007 | Sterling et al. |
| 2008/0195977 A1 | 8/2008 | Carroll et al. |
| 2009/0080769 A1 | 3/2009 | Kagawa et al. |
| 2009/0102968 A1 | 4/2009 | Doser et al. |
| 2009/0109344 A1 | 4/2009 | Ollivier et al. |
| 2009/0174726 A1 | 7/2009 | Ollivier |
| 2009/0201309 A1 | 8/2009 | Demos |
| 2009/0238456 A1 | 9/2009 | Fukasawa |
| 2009/0284554 A1 | 11/2009 | Doser |
| 2009/0285283 A1 | 11/2009 | Gao et al. |
| 2010/0128976 A1 | 5/2010 | Stauder et al. |
| 2010/0134529 A1 | 6/2010 | Doser et al. |
| 2010/0135419 A1 | 6/2010 | Doser et al. |
| 2010/0157154 A1 | 6/2010 | Kobayashi et al. |
| 2010/0220237 A1 | 9/2010 | Doser et al. |
| 2010/0245380 A1 | 9/2010 | Doser et al. |
| 2010/0265264 A1 | 10/2010 | Doser et al. |
| 2010/0289810 A1 | 11/2010 | Doser et al. |
| 2011/0154426 A1 | 6/2011 | Doser et al. |

FOREIGN PATENT DOCUMENTS

| | | | |
|---|---|---|---|
| EP | 0203448 A2 | 12/1986 |
| EP | 0508626 A2 | 10/1992 |
| EP | 0526989 | 2/1993 |
| EP | 0546773 A2 | 6/1993 |
| EP | 0556133 | 8/1993 |
| EP | 0579224 | 1/1994 |
| EP | 0679020 | 10/1995 |
| EP | 0739139 | 10/1996 |

(56) References Cited

FOREIGN PATENT DOCUMENTS

| | | |
|---|---|---|
| EP | 0867880 | 9/1998 |
| EP | 0948194 | 10/1999 |
| EP | 0974934 | 1/2000 |
| EP | 0993180 | 4/2000 |
| EP | 1049324 A2 | 11/2000 |
| EP | 1102478 | 5/2001 |
| EP | 1118963 | 7/2001 |
| EP | 1170576 | 1/2002 |
| EP | 1237379 | 9/2002 |
| EP | 1239668 | 9/2002 |
| EP | 1578140 | 9/2005 |
| EP | 1845704 A2 | 10/2007 |
| JP | 63116277 | 5/1988 |
| JP | 5022658 | 1/1993 |
| JP | 05022658 | 1/1993 |
| JP | 573020 | 3/1993 |
| JP | 6261207 | 9/1994 |
| JP | 7135635 | 5/1995 |
| JP | 7236069 | 9/1995 |
| JP | 8129370 | 5/1996 |
| JP | 7250346 | 9/1996 |
| JP | 08228295 | 9/1996 |
| JP | 11331622 | 11/1999 |
| JP | 2000115564 | 4/2000 |
| JP | 2000132155 | 5/2000 |
| JP | 2000152279 | 5/2000 |
| JP | 2000350050 | 12/2000 |
| JP | 2001148794 | 5/2001 |
| JP | 2002314831 | 7/2001 |
| JP | 200227275 | 1/2002 |
| JP | 2002033936 | 1/2002 |
| JP | 2002118767 | 4/2002 |
| JP | 2002152544 | 5/2002 |
| JP | 2002163668 | 6/2002 |
| JP | 2002218262 | 8/2002 |
| JP | 2002262120 | 9/2002 |
| JP | 2002281518 | 9/2002 |
| JP | 2004112169 | 9/2002 |
| JP | 2002314937 | 10/2002 |
| JP | 2002359858 | 12/2002 |
| JP | 200387586 | 3/2003 |
| JP | 2003125227 | 4/2003 |
| JP | 2003143425 | 5/2003 |
| JP | 2003153297 | 5/2003 |
| JP | 2003169220 | 6/2003 |
| JP | 2003241732 | 8/2003 |
| JP | 2004032700 | 1/2004 |
| JP | 200496506 | 3/2004 |
| JP | 2004110647 | 4/2004 |
| JP | 2004129149 | 4/2004 |
| JP | 2004228734 | 8/2004 |
| JP | 2004240606 | 8/2004 |
| JP | 2004242066 | 8/2004 |
| JP | 2004282599 | 10/2004 |
| JP | 2005012285 | 1/2005 |
| JP | 2005265927 | 9/2005 |
| JP | 2005287069 | 10/2005 |
| JP | 2005318491 | 11/2005 |
| KR | 2001002261 | 6/1999 |
| KR | 2001002261 | 1/2001 |
| KR | 10800736 | 1/2008 |
| WO | 8606906 | 11/1986 |
| WO | WO9209963 | 6/1992 |
| WO | 0074372 | 12/2000 |
| WO | 0178004 | 10/2001 |
| WO | WO0178368 | 10/2001 |
| WO | 2006039357 A1 | 4/2006 |
| WO | WO2006050305 | 5/2006 |
| WO | 2008085150 A1 | 7/2008 |

OTHER PUBLICATIONS

Internet Citation: "High Definition Multimedia Interface Specification Version 1.3", Jun. 22, 2006.

White Paper, "Windows Color System: The Next Generation Color Management System", Microsoft Windows, Sep. 2005.

Takahashi et al.: "Method for Color Gamut compression Based on Subjective Evaluation", Proceedings of the SPIE-The International Society for Optical Engineering. vol. 4662, pp. 455-464, Jan. 2002.

Office Action for U.S. Appl. No. 12/086,707 mailed Apr. 28, 2011.

Wu Feng, A Framework for Efficient Progressive Fine Granularity Scalable Video Coding, IEEE Transactions on circuits and system for video technology, vol. 11, No. 3 Mar. 2001. pp. 332-344.

Ebner Fritz et al.: Gamut Mapping from below: finding minimum perceptual distrances for colors outside the gamut vol. 31 Jan. 1997 p. 402-413.

Spaulding et al.: Extending the color gamut and dynamic range of an sRGB image using a residual image vol. 28, No. 4, Aug. 2003, pp. 251-266.

Spaulding et al.: Using a residual image to extend the color gamut and dynamic range of a sRGB image, final program proceedungs if the Digital Photography Conference 2003, pp. 307-314, Publ. Springfiled, VA, USA 2003.

Spaulding et al.: Optimized extended gamut color encoding for scene-referred and output-referred image states. Journal of Imaging Sci. and Tech., vol. 45, No. 5, p. 418-426, Sep.-Oct. 2001.

Gibson, On constant luminance, gamma correction, and digitization of color space, IEEE 1995 Intl. Conf. on cons. Elect. Digest of Tech. Papers. pp. 178-179, Publ.: NY, NY, USA, 1995, 430 pp.

Tinker M.: Film versus digital cinema: the evolution of moving images. Proceedings of the SPIE-The Intl Society for Optical Eng., vol. 5022, pp. 14-23, 2003.

Bruns et al. Compression of moving pictures for digital cinema using the MPEG-2 toolkit. SMPTE journal, vol. 110, No. 6, pp. 359-364, Jun. 2001.

Wallace et al.: Color gamut matching for tiled display walls. pp. 293-302, Publ.: Aire-la Ville, Switzerland, 2003, 335 pp.

Meier R.: A color model for digital photo printing on silver halide paper,. pp. 442-447. Publ. Springfield, VA, USA, 2002, xviii+648 pp.

Oh et al.: A systolic pipelined NTSC/PAL digital video encoder. IEICE Trans. on Fundamentals of Elec. Comm. & Computer Sciences, vol. E81-A, No. 6. pp. 1021-1028, Jun. 1998.

Office Action for U.S. Appl. No. 12/083,026 mailed Jun. 2, 2011.

Office Action for U.S. Appl. No. 10/593,195 restriction mailed Oct. 20, 2009.

Office Action for U.S. Appl. No. 10/593,195 mailed Jan. 28, 2010.

Office Action for U.S. Appl. No. 10/593,195 Final mailed Jul. 9, 2010.

Notice of Allowance for U.S. Appl. No. 10/593,195 mailed Mar. 1, 2011.

Notice of Abandonment for U.S. Appl. No. 10/593,195 mailed Mar. 17, 2011.

Specification ICC. 1:Oct. 2004, Image Technology Colour Management-Architecture, Profile Format, and Data Structure, International Color Consortium, May 22, 2006.

Morovic et al.: "The Fundamentals of Gamut Mapping: A Survey", draft submitted to the Journal of Imaging Science and Technology, 45/3:2182-290, 2001.

Bourgoin, "Windows Color System: Evolution in the Microsoft Color Management Ecosystem", Windows Digital Document Platforms & Solutions Group, Microsoft Corporation, 2005.

IEC 61966-2-4, "Multimedia systems and equipment—Colour measurement and management—Part 2-4" Colour management—Extended-gamut YCC colour space for video application -xvYCC International Electrotechnical Commission, Jan. 2006.

Office Action for U.S. Appl. No. 12/224,538 mailed Jun. 7, 2011.
Office Action for U.S. Appl. No. 12/224,538 mailed Nov. 22, 2011.
Office Action for U.S. Appl. No. 12/083,026 mailed Oct. 31, 2011.
Office Action for U.S. Appl. No. 12/086,707 mailed Nov. 22, 2011.
Office Action for U.S. Appl. No. 12/452,361 mailed Jan. 11, 2012.
Office Action for U.S. Appl. No. 12/450,637 mailed Mar. 20, 2012.
Office Action for U.S. Appl. No. 12/224,538 mailed Jun. 29, 2012.
Office Action for U.S. Appl. No. 12/227,672 mailed Apr. 19, 2012.
Office Action for U.S. Appl. No. 12/452,130 mailed Mar. 8, 2012.
Office Action for U.S. Appl. No. 12/452,361 mailed Jul. 23, 2012.
Office Action for U.S. Appl. No. 12/224,538 mailed Sep. 14, 2012.
Office Action for U.S. Appl. No. 12/452,130 mailed Sep. 20, 2012.

(56) References Cited

OTHER PUBLICATIONS

Notice of Allowance for U.S. Appl. No. 12/227,672 mailed Nov. 19, 2012.
Notice of Abandonment for U.S. Appl. No. 12/452,361 mailed Mar. 5, 2013.
Campadelli et al., "A System for the Automatic Selection of Conpicuous Color Sets for Qualtative Data Display", IEEE Transaction on Geoscience and Remote Sensing, vol. 39, 2283-2288, Oct. 2001.
Koh et al., "Issues Encountered in Creating a Version 4 ICC sRGB Profile", Proceedings of IS&T/SID Eleventh Color Imaging Conference: pp. 232-237, Springfield, VA (2003).
Mahy, "Gamut Calculation of Color Reproduction Devices", The Fourth Color Imaging Conference: Color Science, Systems and Application, (1996).
Saito et al., "3D Gamut Mapping by Comparision Between Image and Device Gamut Description", Chiba, Japan, International Congress of Imaging Science (2012).
Schmitz et al., "Color Palette Restoration," Graphical Models and Image Processing, vol. 57, No. 5, Sep. 1995, pp. 409-419.
Office Action for U.S. Appl. No. 12/224,538 mailed Apr. 19, 2013.
Office Actions for U.S. Appl. No. 12/083,026 mailed Jun. 2, 2011, Nov. 16, 2012.
Office Action for U.S. Appl. No. 12/450,622 mailed Feb. 20, 2013.
Office Action for U.S. Appl. No. 12/450,637 mailed Oct. 15, 2012.
Office Action U.S. Appl. No. 12/450,621 mailed Feb. 27, 2013.
Notice of Allowance for U.S. Appl. No. 12/450,622; mailed on Aug. 28, 2013.
Notice of Allowance for U.S. Appl. No. 12/450,622; mailed on Aug. 18, 2014.
Office Action for U.S. Appl. No. 12/083,026 mailed Sep. 6, 2013.
Office Action for U.S. Appl. No. 12/083,026 mailed Apr. 10, 2014.
Notice of Allowance for U.S. Appl. No. 12/086,707 mailed Oct. 10, 2012.
Notice of Allowance for U.S. Appl. No. 12/086,707 mailed Mar. 5, 2013.
Notice of Allowance for U.S. Appl. No. 12/086,707 mailed Jan. 3, 2014.
Notice of Allowance for U.S. Appl. No. 12/224,538 mailed Nov. 29, 2013.
Withdrawal of Notice of Allowance for U.S. Appl. No. 12/224,538 mailed Mar. 3, 2014.
Notice of Allowance for U.S. Appl. No. 12/224,538 mailed Mar. 20, 2014.
Notice of Allowance for U.S. Appl. No. 12/450,622 mailed Aug. 28, 2013.
Office Action for U.S. Appl. No. 12/450,622 mailed Dec. 30, 2013.
Examiner's Answer to Appeal Brief for U.S. Appl. No. 12/450,637 mailed Sep. 27, 2013.
Notice of Allowance for U.S. Appl. No. 12/450,621 mailed Aug. 30, 2013.
Office Action for U.S. Appl. No. 12/450,621 mailed Dec. 13, 2013.

\* cited by examiner

US 8,994,744 B2

METHOD AND SYSTEM FOR MASTERING AND DISTRIBUTING ENHANCED COLOR SPACE CONTENT

CROSS REFERENCE TO RELATED APPLICATIONS

This application claims the benefit, under 35 U.S.C. §365 of International Application PCT/US2005/039352, filed Oct. 27, 2005 which was published in accordance with PCT Article 21(2) on May 11, 2006 in English and which claims the benefit of U.S. provisional patent application No. 60/623,882 filed Nov. 1, 2004.

BACKGROUND ART

1. Field of the Invention

The present invention relates to content creation and delivery. More particularly, the present invention relates to a method and system for enhancing content creation and delivery for use with new emerging display technologies not based on CRT.

2. Description of the Prior Art

With today's current technology, it is difficult, if not impossible to re-create a content creator's artistic intent (i.e., with respect to color) on a video display device, especially a video display device for home use. Generally speaking, the only place where such re-creation is possible is in the theater on either film or digital cinema. This "content creator's artistic intent" with respect to color is referred to herein as the "color space" of the content.

The color space for consumer use has been always targeted for traditional Cathode Ray Tube (CRT) display devices. The idea of extending the color space for different display devices has been the subject of research and publication. Several companies have proposed methods for enhancing the color gamut and/or dynamic range on their display devices, but to date, no known end-to-end system provides backwards compatibility.

New display technologies are under development and are entering the consumer marketplace. Such new display technologies offer greater picture reproduction capabilities than traditional CRT-based displays. However, present-day video content mastering processes, delivery systems, coding systems and signaling are based solely on CRT.

As new display technologies with High Dynamic Range (HDR), Enhanced Color Gamut (ECG), and other features enter the consumer marketplace, it becomes necessary to establish a new content production chain that can maximize the potential of these display technologies. Examples of these types of new display technologies include, but are not limited to, Liquid Crystal Displays (LCD), Liquid Crystal on Silicon (LCOS), Plasma Display Panel (PDP), Organic Light Emitting Diode (OLED), High Dynamic Range (HDR) and Enhanced Color Gamut (ECG) display devices.

FIG. 1 shows the color space relationship 100 in today's post production processes. In this example, three separate color adjustments (106, 108, 110) are performed (i.e., one for film 106, one for digital cinema 108, and one for video 110). The digital course content is color adjusted (104) by a skilled colorist. The Film Master 106 (referred to herein as color space X) requires scene by scene adjustment to prepare the content for film projection. The Digital Cinema Master 108 (Referred to herein as color space Y) requires scene-by-scene adjustments made for digital cinema, and the video master (herein referred to as color space Z) requires a scene-by-scene adjustment made for the home vide environment.

Due to the significant differences between the characteristics of each variation, these color adjustments are very much a creative process and have not been easily automated. To date there exist no widely available mathematical transform that can translate from one of these versions to another. Thus, as these new display types and technologies are added that diverge significantly from those shown in the figure, it becomes necessary to generate additional variant masters to address these new display capabilities.

SUMMARY OF THE INVENTION

It is therefore an aspect of the present principles to provide a system for mastering and distributing enhanced color space video for utilizing the potential of new esolution display screens.

It is a further aspect of the present principles to provide a system and method that is designed to bring the original creative intent of the content creators to the viewer.

It is also another aspect of the present principles to defines a system for creating content that fully utilizes the potential of each new display type, while also addressing the need for efficient production of the increased number of variations These and other aspects are achieved in accordance with present principles, wherein the method for modifying content to obtain enhanced color rendition for a target color space of a target display device includes the step of mastering the content in accordance with instructions from at least one content creator. The mastering includes adjusting the color rendition within the content for each target color space with respect to a reference color space. The master content is encoded in accordance with the target color space specific adjusted color rendition information to enable display of the content with the enhanced color rendition on the target display device.

According to one aspect, the adjusting includes storing each target color space specific adjustment as metadata.

The encoding includes creating an enhanced color channel by identifying base band reference content, compressing the base band reference video content, and determining a color difference between the un-compressed base band reference video content and the compressed base band content.

Once encoded, the content is transmitted over the enhanced color transmission channel. When received, the encoded content, having color information indicative of the adjusted color rendition and the color display properties of the target display device, are adjusted according to the decoded color rendition information. The result is displayed on the viewer's target display device.

The decoded content can include base band reference data and color adjustment data specific to the target color space and adapted to provide a true color reproduction in accordance with display capabilities of the target display device.

According to another aspect of the present principles, the mastering of content includes identifying auxiliary data relating to each target color space and storing the same. In other aspects of the present principles, the metadata can be combined with the auxiliary data before transmission. One of the metadata and/or the auxiliary data includes dynamic display information data relating to adjustments to be made to target display device settings. Examples of such display device settings include brightness, contrast and luminance.

According to yet a further aspect of the present principles, the method for modifying content to obtain enhanced color rendition for a non-standard system target color space of a target display device includes identifying adjustments required to be made to the content in order to reproduce the same on a non-standard system target color space. The adjustments are performed in accordance with instruction from at least one content creator. The identified adjustments for each target color space are stored in a memory, and base band/reference data is encoded along with the stored adjustment data in order to enable display of the content with the enhanced color rendition on a target display device corresponding to the target color space.

The encoding includes creating an enhanced color channel by compressing the base band reference content, and determining a color difference between the un-compressed base band/reference content and the compressed base band/reference content.

The system for modifying video to obtain enhanced color rendition for a target color space of a target display device includes means for adjusting the color rendition within the content in accordance with instruction from at least one content creator, and means for encoding the content having color information indicative of the adjusted color rendition to enable display of the content with the enhanced color rendition on the target display device.

The encoded video is transmitted over an enhanced color channel which is comprises compressed base band/reference video content, and color difference information relating to a color difference between an un-compressed base band/reference content and the compressed base band/reference content.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, like reference numerals denote similar components throughout the views.

DETAILED DESCRIPTION

Figure 1:
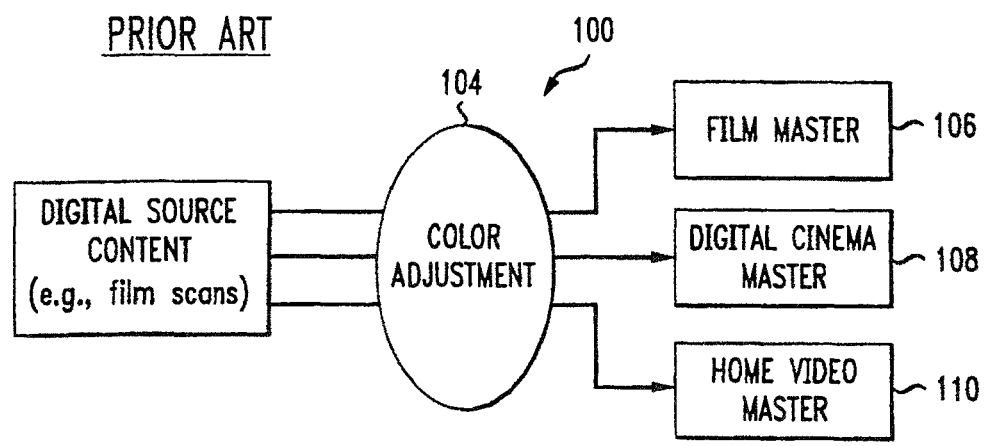
FIG. 1 is block diagram of the color space relationship in today's post-production processes.

The presently described system and method for mastering and distributing enhanced color space content, such as video, is enabled because new display technologies becoming available that provide greater picture reproduction capabilities than the traditional displays, such as traditional CRT-based color television systems. The quality of picture reproduction increases, fewer sacrifices are required from the original intent of the content creator(s). However, with the increased number of new display technologies, each with different display characteristics, there is a need to create an increased number of content variations that address each display technology's individual characteristics.

The "concept" referred to above can be described as providing the viewer with the capability to observe on a display device the content creator's artistic intent, with respect to color, and possibly other image characteristics, such as texture, intensity, noise etc The system and method of the present invention could be referred to throughout this description as "Directors Vision", which as used herein, is synonymous with the same.

As the quality of picture reproduction increases, fewer sacrifices are required from the original intent of the content creator(s). However, with the increased number of new display technologies, each with different display characteristics, there is a need to create an increased number of variations of the content that address each display technology's individual characteristics. The present invention defines a system for creating and delivering content that fully utilizes the potential of each new display type, while also addressing the need for efficient production of these increased number of variations.

The following description refers to a "standard video system," which is defined herein to mean any existing video system or video signaling format whose color space is based on traditional CRT phosphor technologies, with standard or high definition (e.g. NTSC, PAL, SECAM, CCIR-601, ITU-R bt.709, etc.). As will become apparent, the technique of the present principles can be applied to other types of content delivery systems.

The following description also makes reference to a theoretical media source (e.g., a "player,") which can be interpreted to mean any DVD, HD Blu-Ray Disc, cable, satellite or other device, including personal computers and game consoles capable of providing content to a display device.

The Directors Vision system of the present invention provides a better picture for display devices that are capable of such display, such as HDR displays for example. One possible system for delivering this content could be:

Directors Vision authored-HD optical disc→Directors Vision-capable player→HDR television Other delivery paths are possible and the actual decoder can exist in several places. In all cases, the content must be created with a known or reference color space.

It is to be understood that the technique of the present principles could be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program could be uploaded to, and executed by, a machine comprising any suitable architecture.

Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein either could be part of the microinstruction code or part of the application program (or a combination thereof) that is executed via the operating system. In addition, various other peripheral devices could be connected to the computer platform such as an additional data storage device and a printing device.

It is to be further understood that, because some of the constituent system components and method steps depicted in the accompanying Figures are preferably implemented in software, the actual connections between the system components (or the process steps) could differ depending upon the manner in which the present invention is programmed. Given the teachings herein, one of ordinary skill in the related art will be able to contemplate these and similar implementations or configurations of the present invention.

The description of the present invention is broken into the following four (4) areas: 1) Content Creation; 2) Content Packaging; 3) Content Decoding; and 4) Content Display.

Figure 2:
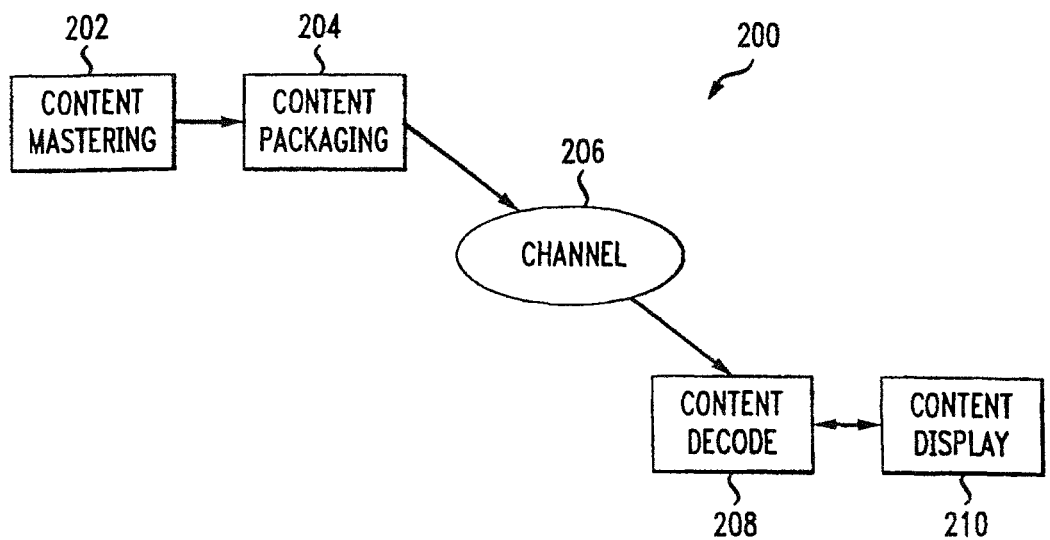
FIG. 2 is end to end block diagram of the method for mastering and distributing enhanced color space content to the consumer's home according to an embodiment of the present principles.

FIG. 2 shows a high-level block diagram of the system 200 for the method and system for mastering and distributing enhanced color space content, according to an aspect of the invention. As shown, initially the content is mastered (202), and then packaged (204). The packaged content is transmitted through a channel (206), received by a decoder (208) where it is decoded for display (210) on the consumer's display device.

I. Content Creation/Mastering

Figure 3:
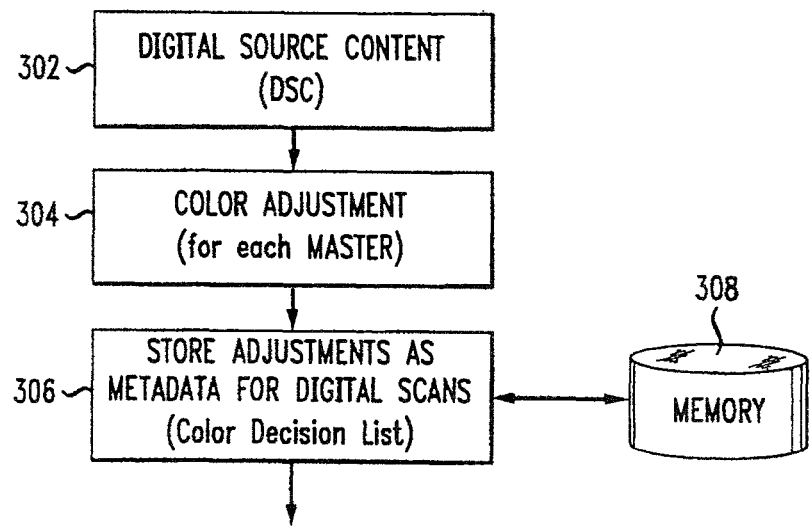
FIG. 3 is a block diagram of the content mastering according to an embodiment of the present principles.

FIG. 3 shows a block representation of some of the primary steps performed during the Content Creation/Mastering step 202 of FIG. 2. A colorist starts with high resolution digital source content—DSC during step 302 and adjusts the color display during step 304, in conjunction with the content creator's intent, as viewed on a calibrated display device (for example, a digital projector calibrated to the P7V2 digital cinema color space). Because each type of display has significantly different display characteristics, it is essentially a creative process to create a different master for each. With the entrance of new display technologies into the marketplace that afford expanded visual capabilities, additional content variants must be created to fully utilize these technologies. The Directors Vision system as described herein defines a mechanism for creating each of these different masters in a non-destructive manner. This is done by starting with Digital Source Content (DSC) such as . digital scans of film elements during step 302, thereafter performing the color adjustments for each individual master during step 304, and then storing those color adjustments as metadata for the digital scans (i.e. a "Color Decision List") during step 306. When one variant master will be similar to another, such as a digital cinema master similar to a film master, the similar master can be used as a basis for deriving the variant content. The metadata undergoes storage in a memory device 308 of any suitable known type (e.g., ROM, RAM, Optical media, Magnetic media, etc.).

By way of example, the mastering of content can include; 1) The original edited elements of a film being scanned digitally to serve as the Digital Source Content (DSC) during step 302 A series of adjustments are made to create the film master (for each type of target color space, i.e., each type of display device) and are stored as metadata (i.e. the color decision list) during steps 304 and 306 of FIG. 3) The film master's color decision list can then be used as a basis for deriving the digital cinema master (again, composed of the original digital source data plus the color decision list metadata); and 4) When it is later time to create the video master, which varies more widely from the other two, either one of the existing color decision lists (metadata) can be used as a reference, or it can be generated from scratch.

In accordance with other contemplated embodiments, the metadata can include other information for controlling the display of content in the target color space of the display device. By way of example, the metadata can control the contrast and/or brightness of the image, as well as other parameters such as texture, noise and/or intensity. During content creation, the content creator could thus define settings for the display device to follow, assuming the device has the ability to make use of such information. These settings could be based, for example, on environmental lighting conditions where the 'target' display device is located, and could be adjusted automatically as those conditions change over time (e.g. daytime versus nighttime viewing).

Another area where the metadata can be used is in dynamic range enhancement. Often, the full dynamic range of the output device is not used. In addition, new display devices with much wider dynamic range are emerging As mentioned below, the auxiliary data can carry dynamic range information instead of or in addition to the metadata, depending on the particular implementation of the Directors Vision system of the present principles.

II. Content Packaging

Figure 4:
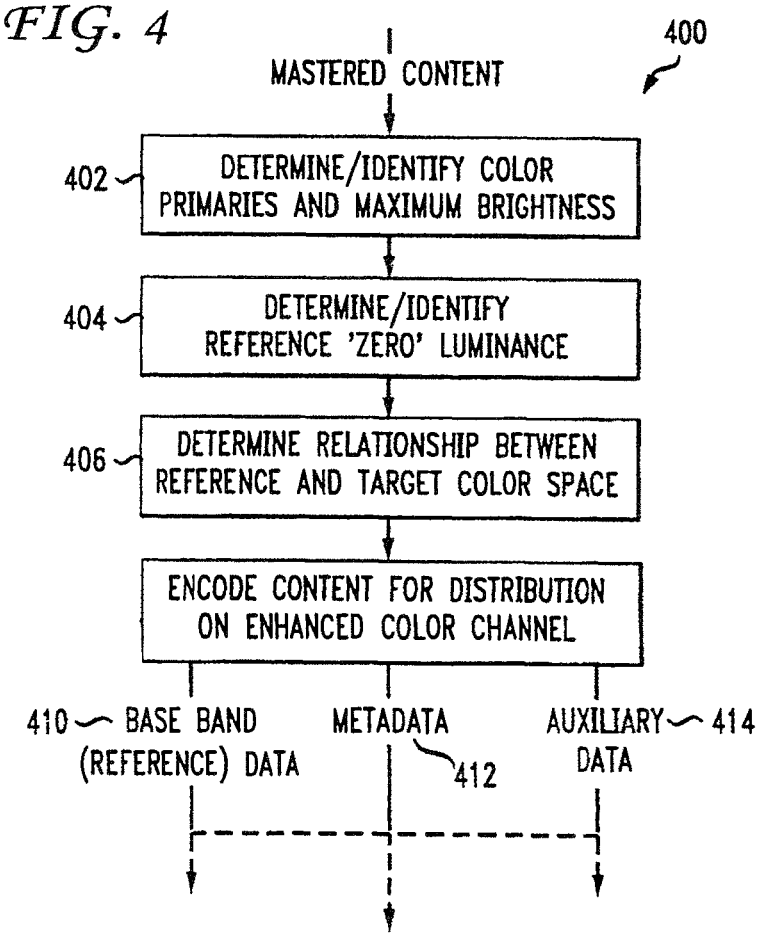
FIG. 4 is a block diagram representing the content packaging/coding according to an embodiment of the present principles.
Figure 5:
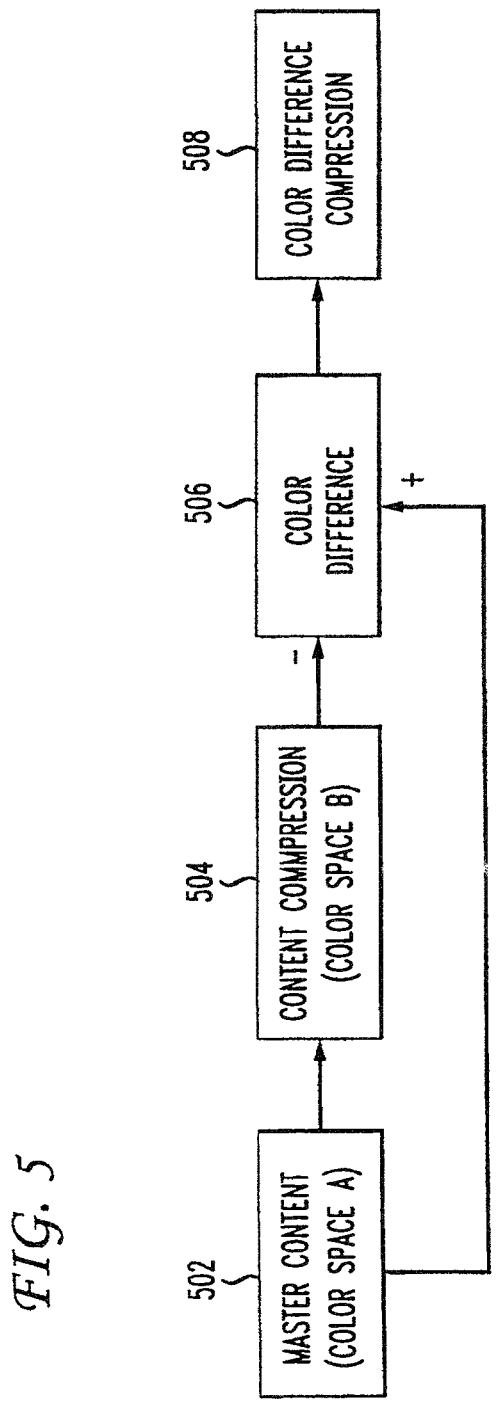
FIG. 5 is a block diagram representing creation of an enhanced color channel as part of the content packaging aspect of the present principles.

Content packaging comprises the encoding the content such that it can be distributed on packaged media (or delivered via a channel with finite bandwidth) and played on both standard and enhanced video systems. In addition, the content packaging includes the creation of an enhanced color channel. FIGS. 4-5 show block diagrams representing the content packaging 204 according to an embodiment of the present principles.

There are described two possible methods for encoding (i.e., packaging) the content. Those of ordinary skill in the art will recognize that some methods could be more practical than others depending on storage media or other variable factors, but could be used without departing from the spirit of the present invention.

The two proposed methods are:
A. A special Directors Vision encoding format containing the original uncompressed or losslessly compressed digital source content (DSC) with additional metadata describing how to manipulate the original content to be best represented on each type of video system. The potential downside of this is that the data size on the media could be very large and a complex color processing is needed for each system. This encoding technique could prove to be most useful during the content creation stage; and
B. Extended color representation metadata sent as an auxiliary stream along with the base-band content that can be displayed correctly on a standard video system. The metadata would describe how to manipulate the baseband content to "step up" to an enhanced target display.

Referring to FIGS. 4-5, with either approach, in order to properly encode the color-space data, it is first necessary to establish the color primaries (402) that are used to encode the content. This information can be represented most simply by using CIE color space coordinates. When the original mastering of the content is done, a suitably calibrated display must be used. The value of the color primaries and the maximum brightness value must be known or measured (402). It is also important that the reference display has linear color tracking within a few milli-CIE, and that the reference 'zero' luminance value is known (404). With this information, a precise, portable reproduction of the original color is possible. Once this information is obtained, the content (base band) data 410, auxiliary data and/or metadata 412 are encoded for transmission over the channel. Those of skill in the art recognize that the reference display is a fundamental working element of any portable standard.

In order to encode the data according to the present invention, it is necessary to determine the relationship between the reference color space and each 'target' color space (step 406). In general, the 'target' color space will be smaller than the reference color space. The 'target' color space will depend on the expected display medium (film, CRT, or some other display). In today's context, the 'target' display would be a CRT, as this is the current industry standard. Colors that fall outside of the target device's gamut would be encoded as an 'auxiliary' data stream.

Those of skill in the art will recognize that there are many different algorithms that can be implemented in the converting of the reference color space to the target color space. Some which could be proprietary, others of which could be readily available to the public. By way of example, the colors from the reference space that are outside the 'target' might simply be set to the nearest color that falls on the boundary of the 'target' color space.

FIG. 4 shows that the encoded output includes the base band data 410, the stored metadata 412 relating to each display type, and/or auxiliary data 414. In other contemplated aspects of the present principles, the metadata 412 can be included as part of the auxiliary data 414 to minimize the size and/or bandwidth required to transmit the content over the transmission channel.

One advantage to the method of the present principles is that the size of the auxiliary data (and/or metadata) is determined by the difference between the reference color space and the 'target' display or color space. In some cases, this difference could be zero, but it can be as large as needed to represent the original digital source content. It should be noted, however, that this principle can apply to a reference display, which has more than 3 color primaries, in fact, any number of color primaries is allowed.

Method A

According to one possible embodiment, the first method defined above for storing the color information begins by storing the entire original digital source content (perhaps with lossless or even lossy compression) along with additional metadata for each type of supported display type. For example, when addressing both a standard video system (e.g. NTSC) and one enhanced video system (e.g. a type High Dynamic Range display), the original digital source content would be stored along with the standard video system color metadata and the enhanced video system metadata (i.e. DSC+ NTSC metadata+HDR metadata). In this way, a wide array of display types can be supported by simply adding additional metadata to the package. (It is assumed that the metadata will generally be much more compact than the digital source content, itself.) However, one significant drawback to this approach is that it is generally incompatible with existing video formats that are not Directors Vision capable.

Method B

The second method defined above addresses the compatibility issue by starting with base-band encoded digital source content that is compatible with standard video systems. To create this content, the original digital source content must be processed according to the adjustments necessary for the standard video format. The resulting modified source content would then form the basis of what is stored (with or without compression) in the package. When played back directly, without modification, the content would play properly on a standard video system. In order to support an enhanced video system, additional metadata would be included to describe how to "step up" to the enhanced system. This metadata would be derived by considering the color space difference between the enhanced video system's "target" device and the standard video system's device. These difference values would provide the information necessary to convert the standard video system content into content that is suitable for the enhanced video system. Taking the example given above, the package would contain the NTSC content and metadata for the converting this to the enhanced video system (i.e. NTSC Content+NTSC-to-HDR metadata). This would allow the existing content to play properly to the standard video system (remaining compatible with existing package media formats), while also providing a mechanism for a special Directors Vision-capable player to use the extra metadata to support the enhanced video system, as well.

FIG. 5 shows a block diagram representation of the creation of the enhanced color space according to part of the encoding and decoding aspects of the present invention. The mastered content 502 (color space A) is created as described above. This mastered content 502 includes the metadata for display types as described above. A compressed version of the master is the created. Thus, the color space A undergoes both a transformation and compression and is represented by the content compression (Color Space B) 504. By compressing the master content, there results a color difference 506. This color difference 506 can be compressed (508) if desired. The color difference 506 plus the color space B can be used to recreate the new color space C more accurately.

III. Content Decoding

As will be understood, the content decoding can take several forms, and ultimately is dependent on the encoding technique used to package the content for channel transmission.

Figure 6A:
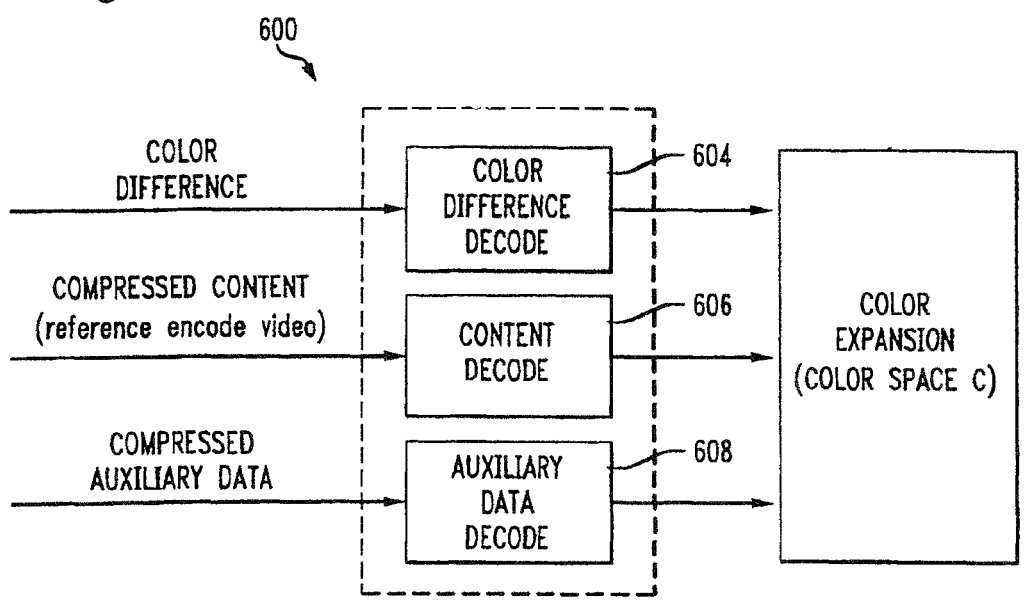
FIG. 6a is a block diagram of the decoding performed in the system and method for mastering and enhancing color space video according to an embodiment of the present principles.
Figure 6B:
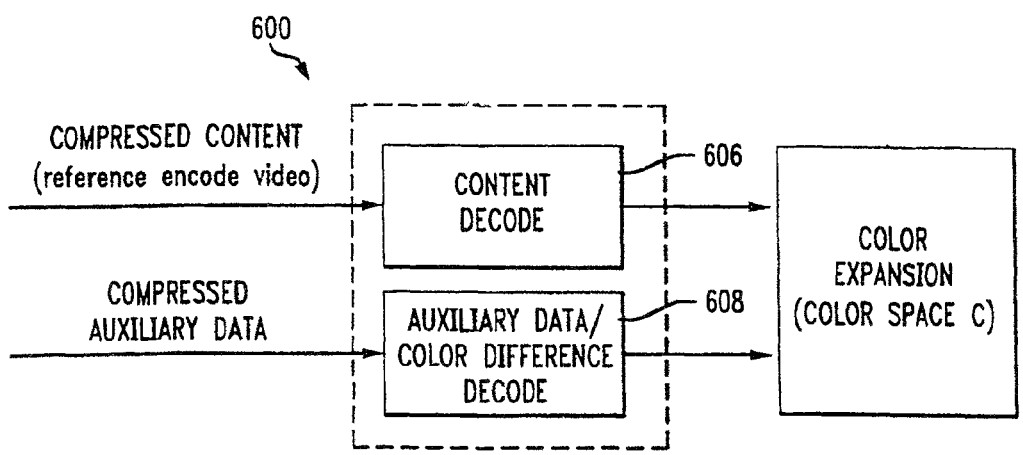
FIG. 6b is a block diagram of the decoding performed in the system and method for mastering and enhancing color space content according to another embodiment of the invention.

FIGS. 6*a* and 6*b* show the decoding side of the received transmission, where the decoded color difference and the decoded master content (with metadata) are combined to recreate the color expansion, or color space C of the Target Color Space (i.e., consumer display device). Color space C is designated or targeted toward a specific class of display devices (e.g., plasma, LCD, DLP, etc.). It will be apparent to those of skill in the art that the color space C is a much closer approximation of Color Space A than a simple decompression of the compressed Color Space B would be.

FIG. 6*a* shows one embodiment of the decoding 600 according the present invention. As shown and will be described, the decoded content 606 is re-combined with the decoded color difference 604 for the target color space, to reproduce the color space C corresponding to the same. The display specific metadata contained within the decoded content is also used during the decoding in order to format the new color space C for the particular consumers display device (i.e., target color space). Depending on the type of display device and other data relating to dynamic range, etc., the auxiliary data 606 could or could not be used during decoding.

The following are some proposed exemplary methods for decoding according the present invention:

(a) A special Directors Vision -capable player that performs all color determination. In this format, the player will perform all of the decoding and color determination. The player has the capability of providing both standard and enhanced video output; or (b) A special player that passes Directors Vision information to a special Directors Vision-capable display. In this format, the player performs decoding but passes the color information (including both encoded video and additional color metadata and/or auxiliary data) to the display device for processing. (Note, the metadata could be transferred via an alternate path or connection to the display device, such as via an Ethernet port.) When connected to a non-capable (i.e. standard video system) display device, only the base-band content color information appropriate for that device is delivered. In both proposed methodologies, a key goal is to maintain full support for both standard video systems and the new features of enhanced video systems at all times.

Once the content has been suitably mastered and encoded, the decoding is also straightforward. For a 'target' device whose color gamut matches the reference for the encoded content, the auxiliary data is ignored during decoding. However, for a 'target' device whose color gamut differs from the encoded content's source reference, it is necessary to decode the auxiliary data 608 and convert the result into a format that is accepted by the display (e.g. RGB or YUV). Depending on the native color representation of the display device, the display could require first decoding and applying the auxiliary data within a theoretical color model, and then converting the result to the display device's native color representation. This could be necessary, for example, if the display device's native color representation is unable to represent all of the original source color values. For instance, it could be desirable to perform all Directors Vision color coding and manipulation in the YUV color space, and then convert the final value to RGB for transmission to the display device.

IV. Content Display

Figure 7A:
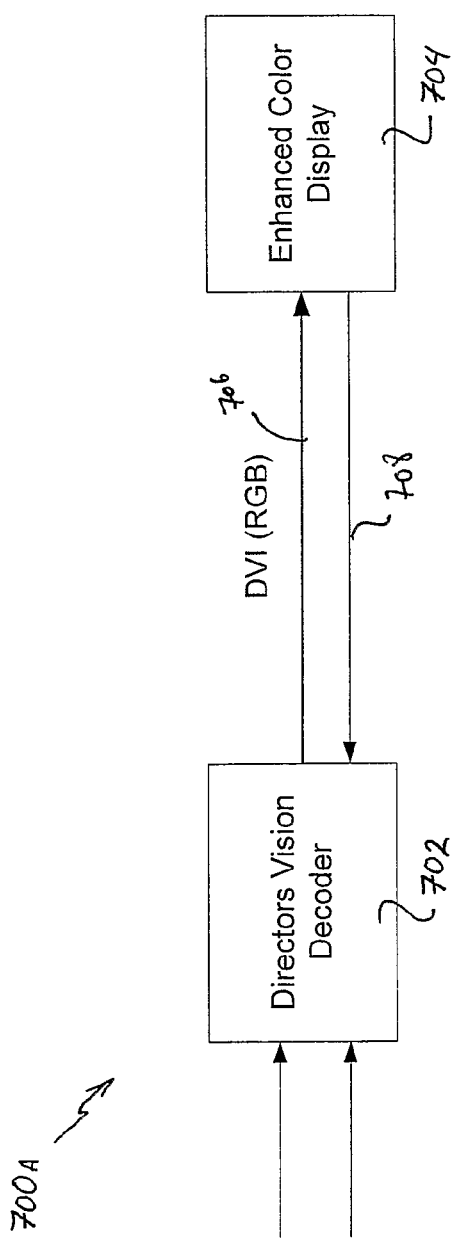
FIGS. 7a and 7b are block diagrams of exemplary types of consumer connections for the implementation of the system and method of the present principles.
Figure 7B:
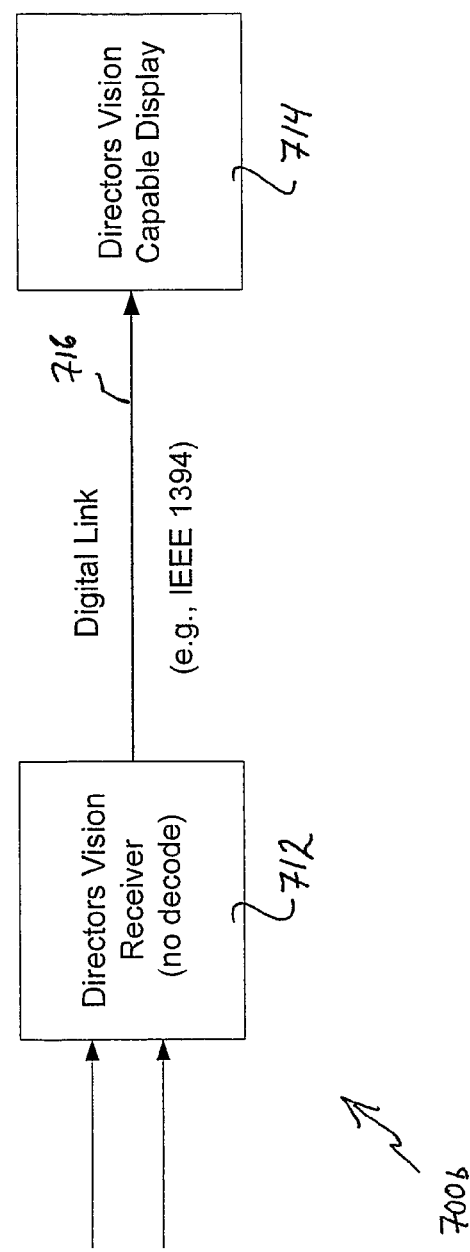

The display of the content is the final step (210) of the method of the present principles. FIGS. 7a and 7b show two exemplary interconnections of two different display devices according to an aspect of the present principles. In the case of content display, it is again necessary for the display device and the decoder to be able to share information about the color capabilities that are available versus those of the reference space (e.g. differences in color primaries between the reference space and the display space). From this information, an appropriate algorithm for interpreting the color information for the display device can be selected. This could be as simple as exchanging data between the decoder and the display so that appropriate color values can be interpolated. However, it could also involve a far more sophisticated process to ensure even better results. (Due to the complexities of the human psycho-visual system and non-linear variations in display color space, simple linear interpolation of color values could not always deliver a sufficient end-user experience.)

FIG. 7a shows a system 700a where the Directors Vision Decoder 702 is connected to an enhanced color display 704, typically via a DVI connection 706. In addition, the display 704 can be in communication with the decoder 702 via DVI connection 706, or utilize a separate suitable communication connection 708.

In some cases, the reference color space and 'target' display device could have a different number of color primaries. For example, the reference color space could have 3 color primaries and a white level and black level defined, whereas the 'target' display could have 7 color primaries along with white and black levels. In such cases, a suitable transcoding process must be performed. In addition, the display device will also need to have a reasonable algorithm (with minimum error) for handling colors that fall outside its supported color space.

Output devices can perform the necessary calculations on the incoming video, but this could be computationally costly. An alternative approach could be utilized in which much of the computational burden is handled during the content creation and packaging stages and sent as data points to a Directors Vision-capable player or display. In this way, the metadata can be either for all of the picture or just parts of the picture, truly capturing the artist's intent in a manner that could not be possible using only the image processor at the end of the video pipeline. FIG. 7b shows an embodiment of the invention where the display device handles the decoding aspect of the present invention. The connection 700b includes a Directors Vision Receiver 712 that does not contain a the Directors Vision decoder, but is connected to a Directors Vision capable display 714 via a digital link 716, such as, for example, an IEEE 1394 or other suitable digital communication medium.

While there have been shown, described and pointed out fundamental novel features of the invention as applied to preferred embodiments thereof, it will be understood that various omissions, substitutions and changes in the form and details of the methods described and devices illustrated, and in their operation, could be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention could be incorporated in any other disclosed, described or suggested form or embodiment as a general matter of design choice. It is the intention, therefore, to be limited only as indicated by the scope of the claims appended hereto.

The invention claimed is:

1. A system for modifying standard system content that is compatible with a standard display device to obtain content with an enhanced color rendition suitable for an enhanced display device, the system comprising:
   a receiver for receiving the standard system content and metadata, wherein the metadata is derived from color space difference between the enhanced display device and the standard display device;
   a decoder for decoding the standard system content and metadata to obtain decoded standard system content and color space difference;
   means for receiving and decoding auxiliary data representing colors that are outside of the enhanced display device's gamut;
   means for converting the decoded auxiliary data into a format compatible with the enhanced display device; and
   means for combining the converted auxiliary data with the decoded standard system content and color space difference for producing the content with the enhanced color rendition in the enhanced color space; and
   means for providing the enhanced color rendition content for display on the enhanced display device.

2. The system of claim 1, wherein at least one of the metadata and auxiliary data includes dynamic display information relating to at least one adjustment to the enhanced display device.

3. The system of claim 2, wherein the at least one adjustment to the enhanced display device includes at least one of brightness, contrast and luminance.

4. A system for providing standard system content compatible with a standard display device for use in converting to content with an enhanced color rendition suitable for an enhanced display device, the system comprising:
- at least one processor for deriving metadata from color space difference between the enhanced display device and the standard display device, and for obtaining auxiliary data that represents colors outside of the enhanced display device's gamut;
- means for encoding the standard system content, the metadata and the auxiliary data for at least one of: distribution on packaged media and transmission over a channel.

5. The system according to claim 4, wherein at least one of the metadata and auxiliary data includes dynamic display information relating to at least one adjustment to the enhanced display device.

6. The system according to claim 5, wherein the at least one adjustment to the enhanced display device includes at least one of brightness, contrast and luminance.

7. A system for modifying standard system content that is compatible with a standard display device to obtain content with an enhanced color rendition suitable for an enhanced display device, the system comprising:
- at least one receiver configured to receive the standard system content and metadata, wherein the metadata is derived from color space difference between the enhanced display device and the standard display device;
- at least one decoder configured to decode the standard system content and metadata to obtain decoded standard system content and color space difference;
- the at least one receiver and the at least one decoder further configured to receive and decode auxiliary data representing colors that are outside of the enhanced display device's gamut;
- at least one processor configured to convert the decoded auxiliary data into a format compatible with the enhanced display device; to combine the converted auxiliary data with the decoded standard system content and color space difference for producing the content with the enhanced color rendition in the enhanced color space; and to provide the enhanced color rendition content for display on the enhanced display device.

8. The system of claim 7, wherein at least one of the metadata and auxiliary data includes dynamic display information relating to at least one adjustment to the enhanced display device.

9. The system of claim 7, wherein the at least one adjustment to the enhanced display device includes at least one of brightness, contrast and luminance.

10. A system for providing standard system content compatible with a standard display device for use in converting to content with an enhanced color rendition suitable for an enhanced display device, the system comprising:
- at least one processor configured to derive metadata from color space difference between the enhanced display device and the standard display device, and for obtaining auxiliary data that represents colors outside of the enhanced display device's gamut;
- at least one encoder configured to encode the standard system content, the metadata and the auxiliary data for at least one of: distribution on packaged media and transmission over a channel.

11. The system according to claim 10, wherein at least one of the metadata and auxiliary data includes dynamic display information relating to at least one adjustment to the enhanced display device.

12. The system according to claim 10, wherein the at least one adjustment to the enhanced display device includes at least one of brightness, contrast and luminance.

13. A method for modifying standard system content that is compatible with a standard display device to obtain content with an enhanced color rendition suitable for an enhanced display device, the system comprising:
- receiving, using at least one receiver, the standard system content and metadata, wherein the metadata is derived from color space difference between the enhanced display device and the standard display device;
- decoding, using at least one decoder, the standard system content and metadata to obtain decoded standard system content and color space difference;
- receiving and decoding, using the at least one receiver and decoder, auxiliary data representing colors that are outside of the enhanced display device's gamut;
- converting the decoded auxiliary data into a format compatible with the enhanced display device;
- combining the converted auxiliary data with the decoded standard system content and color space difference for producing the content with the enhanced color rendition in the enhanced color space; and
- providing the enhanced color rendition content for display on the enhanced display device;
- wherein the converting, the combining and the providing steps are performed by at least one processor.

14. The method of claim 13, wherein at least one of the metadata and auxiliary data includes dynamic display information relating to at least one adjustment to the enhanced display device.

15. The method of claim 13, wherein the at least one adjustment to the enhanced display device includes at least one of brightness, contrast and luminance.

* * * * *